US009003523B2

(12) United States Patent
Stolfo et al.

(10) Patent No.: US 9,003,523 B2
(45) Date of Patent: Apr. 7, 2015

(54) SYSTEMS, METHODS, AND MEDIA FOR OUTPUTTING DATA BASED UPON ANOMALY DETECTION

(71) Applicants: Salvatore J Stolfo, Ridgewood, NJ (US); Ke Wang, Sunnyvale, CA (US); Janak Parekh, Manhasset, NY (US)

(72) Inventors: Salvatore J Stolfo, Ridgewood, NJ (US); Ke Wang, Sunnyvale, CA (US); Janak Parekh, Manhasset, NY (US)

(73) Assignee: The Trustees of Columbia University in the City of New York, New York, NY (US)

(*) Notice: Subject to any disclaimer, the term of this patent is extended or adjusted under 35 U.S.C. 154(b) by 0 days.

(21) Appl. No.: 13/891,031

(22) Filed: May 9, 2013

(65) Prior Publication Data

US 2015/0058981 A1    Feb. 26, 2015

Related U.S. Application Data

(63) Continuation of application No. 12/280,970, filed as application No. PCT/US2007/005406 on Feb. 28, 2007, now Pat. No. 8,448,242.

(60) Provisional application No. 60/778,008, filed on Feb. 28, 2006, provisional application No. 60/790,626, filed on Apr. 10, 2006.

(51) Int. Cl.
*G06F 21/00* (2013.01)
*H04L 29/06* (2006.01)

(52) U.S. Cl.
CPC .................... *H04L 63/1416* (2013.01)

(58) Field of Classification Search
None
See application file for complete search history.

(56) References Cited

U.S. PATENT DOCUMENTS

| 5,440,723 | A |   | 8/1995  | Arnold et al.         |
|-----------|---|---|---------|-----------------------|
| 5,452,442 | A | * | 9/1995  | Kephart ....... 714/38.1 |
| 5,701,464 | A |   | 12/1997 | Aucsmith              |
| 5,991,714 | A | * | 11/1999 | Shaner ............ 704/9 |
| 6,081,325 | A |   | 6/2000  | Leslie et al.         |
| 7,389,538 | B2| * | 6/2008  | Wells ............. 726/22 |
| 7,805,460 | B2|   | 9/2010  | Artan et al.          |
| 2003/0014662 | A1 | | 1/2003 | Gupta et al.          |
| 2003/0182310 | A1 | | 9/2003 | Charnock et al.       |
| 2004/0111410 | A1 | | 6/2004 | Burgoon et al.        |

(Continued)

OTHER PUBLICATIONS

Barreno, M., et al. "Can Machine Learning Be Secure?", In Proceedings of the 2006 ACM Symposium on Information, Computer and Communications (ASIACCS '06), Taipei, Taiwan, Mar. 21-24, 2006, pp. 16-25.

(Continued)

*Primary Examiner* — Brandon Hoffman
*Assistant Examiner* — Helai Salehi
(74) *Attorney, Agent, or Firm* — Byrne Poh LLP

(57) ABSTRACT

Systems, methods, and media for outputting data based on anomaly detection are provided. In some embodiments, a method for outputting data based on anomaly detection is provided, the method comprising: receiving, using a hardware processor, an input dataset; identifying grams in the input dataset that substantially include distinct byte values; creating an input subset by removing the identified grams from the input dataset; determining whether the input dataset is likely to be anomalous based on the identified grams, and determining whether the input dataset is likely to be anomalous by applying the input subset to a binary anomaly detection model to check for an n-gram in the input subset; and outputting the input dataset based on the likelihood that the input dataset is anomalous.

12 Claims, 5 Drawing Sheets

(56) References Cited

U.S. PATENT DOCUMENTS

| | | |
|---|---|---|
| 2005/0022028 A1 | 1/2005 | Hall |
| 2005/0249214 A1 | 11/2005 | Peng |
| 2006/0015630 A1 | 1/2006 | Stolfo et al. |
| 2006/0149674 A1 | 7/2006 | Cook et al. |
| 2008/0189784 A1 | 8/2008 | Mangione-Smith et al. |
| 2009/0172815 A1 | 7/2009 | Gu et al. |

OTHER PUBLICATIONS

Bloom, B.H., "Space/Time Trade-Offs in Hash Coding with Allowable Errors", In Communications of the ACM, vol. 13, No. 7, Jul. 1970, pp. 422-426.

Christodorescu, M. and Jha, S., "Static Analysis of Executables to Detect Malicious Patterns", In Proceedings of the 12th USENIX Security Symposium (SSYM '03), Washington, DC, USA, Aug. 4-8, 2003, pp. 169-186.

Cowan, C., et al., "Stackguard: Automatic Adaptive Detection and Prevention of Buffer-Overflow Attacks", In Proceedings of the 7th USENIX Security Symposium (SSYM '98), San Antonio, TX, USA, Jan. 26-29, 1998, pp. 63-78.

Crandall, J.R., et al., "On Deriving Unknown Vulnerabilities from Zero-Day Polymorphic and Metamorphic Worm Exploits", In Proceedings of the 12th ACM Conference on Computer and Communication Security (CCS '05), Alexandria, VA, USA, Nov. 7-11, 2005, pp. 235-248.

Detristan, T., et al., "Polymorphic Shellcode Engine Using Spectrum Analysis", In Phrack, vol. 61, Aug. 13, 2003, available at: http://www.phrack.org/issues.html?issue=61&id=9.

Dharmapurikar, S., et al., "Deep Packet Inspection Using Parallel Bloom Filters", In IEEE Micro, vol. 24, No. 1, Jan.-Feb. 2004, pp. 52-61.

Eskin, E., "Sparse Sequence Modeling with Applications to Computational Biology and Intrusion Detection", Dissertation, Columbia University, Apr. 2002, pp. 1-147.

Forrest, S., et al., "A Sense of Self for Unix Processes", In Proceedings of the IEEE Symposium on Security and Privacy (S&P '96), Oakland, CA, US, May 6-8, 1996, pp. 120-128.

International Preliminary Report on Patentability in International Patent Application No. PCT/US2007/05406, filed Feb. 28, 2007, mailed Sep. 12, 2008.

International Preliminary Report on Patentability in International Patent Application No. PCT/US2007/05408, filed Feb. 28, 2007, mailed Sep. 12, 2008.

International Search Report in International Patent Application No. PCT/US2007/05406, filed Feb. 28, 2007, mailed Mar. 31, 2008.

International Search Report in International Patent Application No. PCT/US2007/05408, filed Feb. 28, 2007, mailed Mar. 6, 2008.

Kim, H.A. and Karp, B., "Autograph: Toward Automated, Distributed Worm Signature Detection", In Proceedings of the 13th USENIX Security Symposium, San Diego, CA, USA, Aug. 9-13, 2004, pp. 271-286.

Kolesnikov, O., et al., "Advanced Polymorphic Worms: Evading IDS by Blending in with Normal Traffic", Technical Report GIT-CC-04-15, Georgia Institute of Technology, 2004-2005, pp. 1-22.

Kreibich, C. and Crowcroft, J., "Honeycomb—Creating Intrusion Detection Signatures Using Honeypots", In Proceedings of the Second Workshop on Hot Topics in Networks (HotNets-II), Boston, MA, USA, Nov. 20-21, 2003, pp. 51-56.

Kruegel, C., et al., "Polymorphic Worm Detection Using Structural Information of Executables", In Proceedings of the 8th International Symposium on Recent Advances in Intrusion Detection (RAID '05), Seattle, WA, USA, Sep. 7-9, 2005, pp. 207-226.

Krugel, C., et al., "Service Specific Anomaly Detection for Network Intrusion Detection", In Proceedings of the 2002 ACM Symposium on Applied Computing (SAC '02), Madrid, ES, Mar. 10-14, 2002, pp. 201-208.

Liang, Z. and Sekar, R., "Fast and Automated Generation of Attack Signatures: A Basis for Building Self-Protecting Servers", In Proceedings of the 12th ACM Conference on Computer and Communications Security (CCS '05), Alexandria, VA, USA, Nov. 7-11, 2005, pp. 213-222.

Locasto, M.E., et al., "Application Communities: Using Monoculture for Dependability", In Proceedings of the 1st Workshop on Hot Topics in System Dependability (HotDep '05), Yokohama, Japan, Jun. 30, 2005, pp. 1-5.

Locasto, M.E., et al., "Bloodhound: Searching Out Malicious Input in Network Flows for Automatic Repair Validation", Technical Report, Columbia University, 2006, pp. 1-17.

Locasto, M.E., et al., "FLIPS: Hybrid Adaptive Intrusion Prevention", In Proceedings of the 8th International Symposium on Recent Advances in Intrusion Detection (RAID '05), Seattle, WA, USA, Sep. 7-9, 2005, pp. 82-101.

Locasto, M.E., et al., "Software Self-Healing Using Collaborative Application Communities", In Proceedings of the Network and Distributed System Security Symposium (NDSS '06), San Diego, CA, USA, Feb. 1-3, 2006, pp. 1-13.

Marceau, C., "Characterizing the Behavior of a Program Using Multiple-Length N-Grams", In Proceedings of the New Security Paradigms Workshop (NSPW '00), Co. Cork, Ireland, Sep. 18-21, 2000, pp. 101-110.

Moore, D., et al., "Internet Quarantine: Requirements for Containing Self-Propagating Code", In IEEE Societies Twenty-Second Annual Joint Conference of the IEEE Computer and Communications, vol. 3, Mar. 30-Apr. 3, 2003, pp. 1901-1910.

Naor, M. and Yung, M., "Universal One-Way Hash Functions and their Cryptographic Applications", In Proceedings of the 21st Annual ACM Symposium on Theory of Computing (STOC '89), Seattle, WA, USA, May 14-17, 1989, pp. 33-43.

Newsome, J., et al., "Polygraph: Automatically Generating Signatures for Polymorphic Worms", In Proceedings of the IEEE Symposium on Security and Privacy (S&P '05), Oakland, CA, USA, May 8-11, 2005, pp. 226-241.

Notice of Allowance dated Oct. 15, 2012 in U.S. Appl. No. 12/280,969.

Office Action dated Mar. 13, 2012 in U.S. Appl. No. 12/280,970.

Office Action dated Apr. 11, 2012 in U.S. Appl. No. 12/280,969.

Ramakrishna, M.V., et al., "A Performance Study of Hashing Functions for Hardware Applications", In Proceedings of the 6th International Conference on Computing and Information (ICCI '94), Peterborough, ON, CA, May 26-28, 1994, pp. 1621-1636.

Sekar, R., et al. "Specification-Based Anomaly Detection: A New Approach for Detecting Network Intrusions", In Proceedings of the 9th ACM Conference on Computer and Communications Security (CCS '02), Washington, DC, US, Nov. 18-22, 2002, pp. 265-274.

Sidiroglou, S., et al., "A Dynamic Mechanism for Recovering from Buffer Overflow Attacks", In Proceedings of the 8th Information Security Conference (ISC '05), Singapore, Sep. 20-23, 2005, pp. 1-15.

Sidiroglou, S., et al., "Building a Reactive Immune System for Software Services", In Proceedings of the 2005 USENIX Annual Technical Conference (USENIX '05), Anaheim, CA, USA, Apr. 10-15, 2005, pp. 149-161.

Singh, S., et al., "The EarlyBird System for Real-Time Detection of Unknown Worms", In ACM Workshop on Hot Topics in Networks, Cambridge, MA, USA, Nov. 20-21, 2003, pp. 1-6.

Staniford, S., et al., "How to Own the Internet in Your Spare Time", In Proceedings of the 11th USENIX Security Symposium, San Francisco, CA, USA, Aug. 5-9, 2002, pp. 149-167.

Szor, P. and Ferrie, P., "Hunting for Metamorphic", Technical Report, Symantec Corporation, Jun. 2003, pp. 1-23.

Tan K.M.C., et al., "Undermining an Anomaly-Based Intrusion Detection System Using Common Exploits", In Proceedings of the 5th International Conference on Recent Advances in Intrusion Detection (RAID '02), Zurich, CH, Oct. 16-18, 2002, pp. 54-73.

Tan, K.M.C. and Maxion, R.A., "'Why 6?' Defining the Operational Limits of Stide, and Anomaly-Based Intrusion Detector", In Proceedings of the IEEE Symposium on Security and Privacy (S&P '02), Berkeley, CA, USA, May 12-15, 2002, pp. 188-201.

U. S. Appl. No. 60/855,703, filed Oct. 30, 2006.

(56) References Cited

OTHER PUBLICATIONS

Vargiya, R. and Chan, P., "Boundary Detection in Tokenizing Network Application Payload for Anomaly Detection", Technical Report CS-2003-21, Department of Computer Sciences, Florida Institute of Technology, 2003, pp. 1-15.

Wagner, D. and Dean, D., "Intrusion Detection via Static Analysis", In Proceedings of the IEEE Symposium on Security and Privacy (S&P '99), Oakland, CA, USA, May 14-16, 2001, pp. 156-168.

Wagner, D. and Soto, P., "Mimicry Attacks on Host-Based Intrusion Detection Systems", In Proceedings of the Ninth ACM Conference on Computer and Communications Security (CCS '02), Washington, DC, USA, Nov. 18-22, 2002, pp. 255-264.

Wang, H.J., et al. "Shield: Vulnerability-Driven Network Filters for Preventing Known Vulnerability Exploits", In Proceedings of the 2004 Conference on Applications, Technologies, Architectures, and Protocols for Computer Communications (SIGCOMM '04), Portland, OR, USA, Aug. 30-Sep. 3, 2004, pp. 193-204.

Wang, K. and Stolfo, S.J., "Anomalous Payload-Based Network Intrusion Detection", In Proceedings of the 7th International Symposium on Recent Advances in Intrusion Detection (RAID '04), Sophia Antipolis, FR, Sep. 15-17, 2004, pp. 203-222.

Wang, K., et al., "Anomalous Payload-Based Worm Detection and Signature Generation", In Proceedings of the 8th International Symposium on Recent Advances in Intrusion Detection (RAID '05), Seattle, WA, USA, Sep. 7-9, 2005, pp. 227-246.

Wang, X., et al., "SigFree: A Signature-free Buffer Overflow Attack Blocker", In Proceedings of the 15th USENIX Security Symposium, Vancouver, BC, CA, Jul. 31-Aug. 4, 2006, pp. 225-240.

Written Opinion in International Patent Application No. PCT/US2007/05406, filed Feb. 28, 2007, mailed Mar. 31, 2008.

Written Opinion in International Patent Application No. PCT/US2007/05408, filed Feb. 28, 2007, mailed Mar. 6, 2008.

* cited by examiner

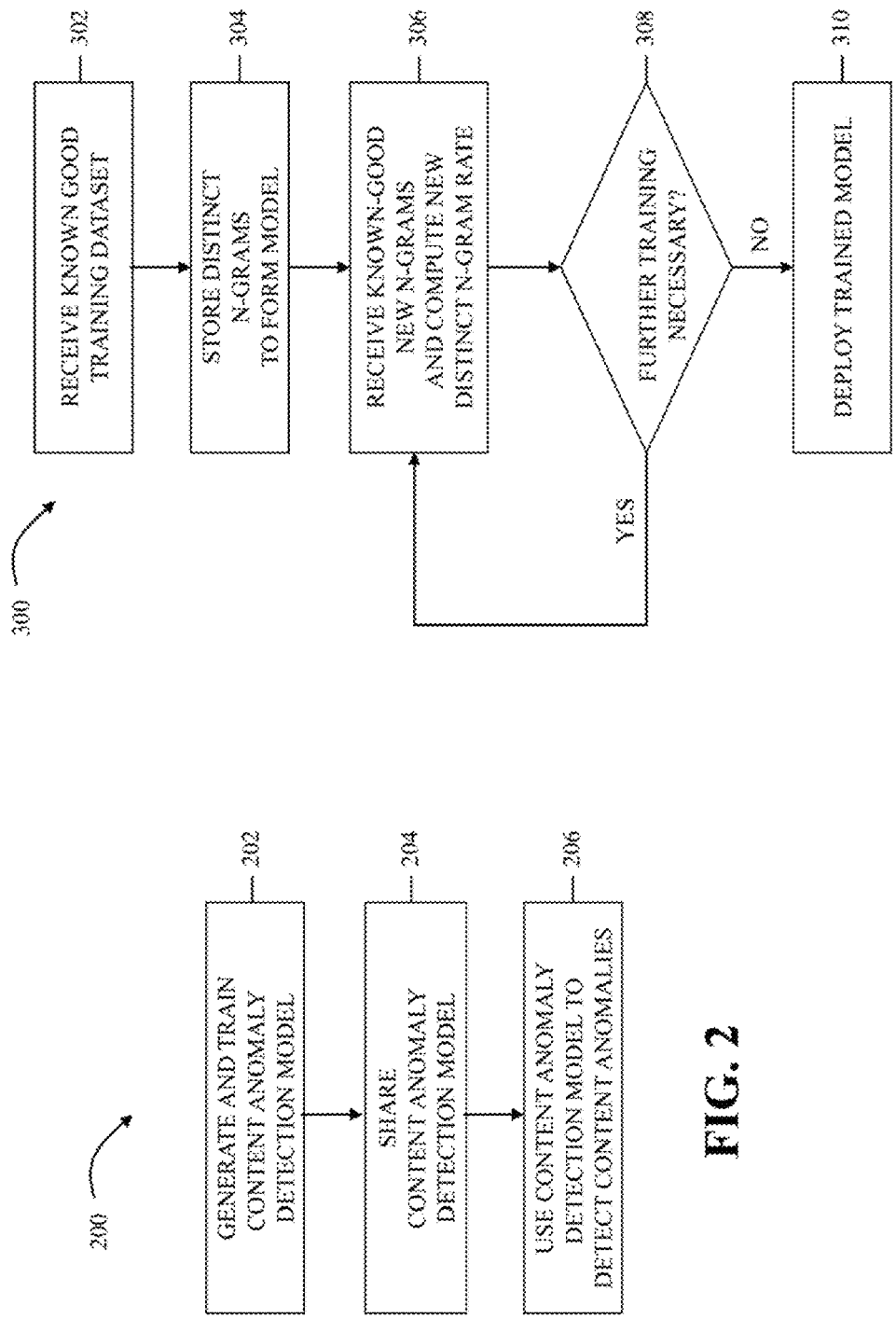

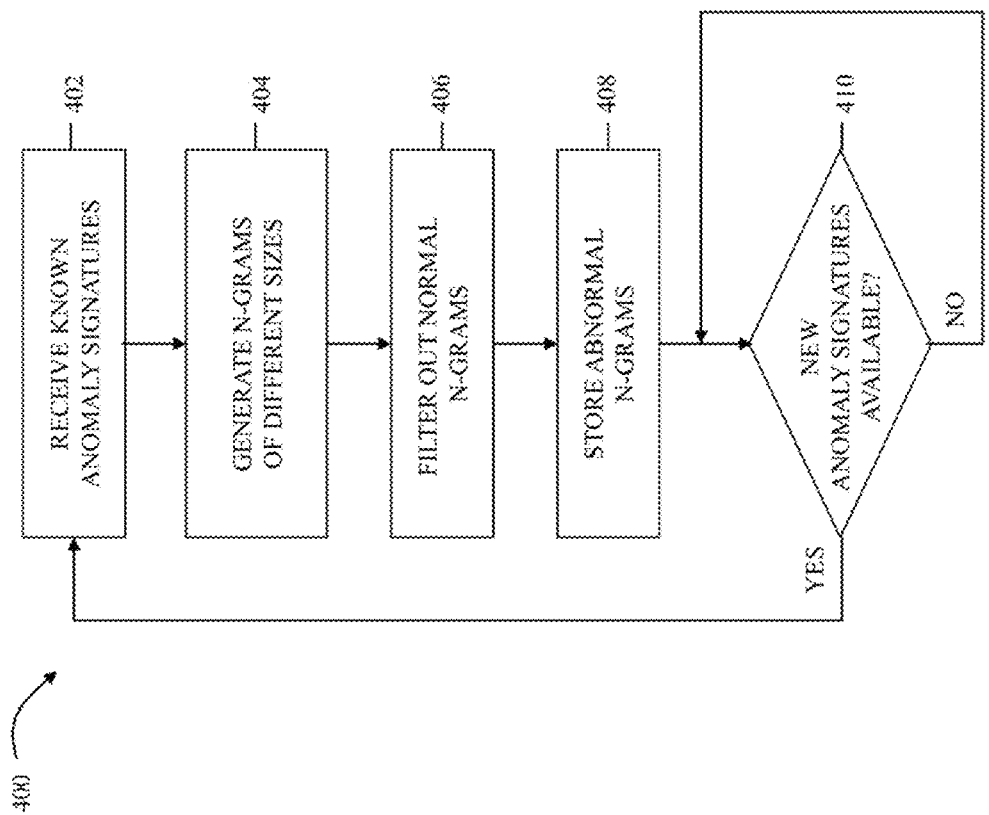

US 9,003,523 B2

SYSTEMS, METHODS, AND MEDIA FOR OUTPUTTING DATA BASED UPON ANOMALY DETECTION

CROSS-REFERENCE TO RELATED APPLICATIONS

This application is a continuation of U.S. patent application Ser. No. 12/280,970, filed Aug. 27, 2009, which is the U.S. National Phase Application under 35 U.S.C. §371 of International Application No. PCT/US2007/005406, filed Feb. 28, 2007, which claims the benefit of U.S. Provisional Patent Application No. 60/778,008, filed Feb. 28, 2006, and U.S. Provisional Patent Application No. 60/790,626, filed Apr. 10, 2006. Each of the above-referenced patent applications is hereby incorporated by reference herein in its entirety.

STATEMENT REGARDING FEDERALLY SPONSORED RESEARCH OR DEVELOPMENT

This invention was made with government support under Grant No. ARO W911NF-04-1-0442 awarded by the Army Research Office. The government has certain rights in the invention.

TECHNICAL FIELD

The disclosed subject matter relates to systems, methods, and media for outputting data based on anomaly detection.

BACKGROUND

Content anomaly detectors have been developed to identify anomalous data in an otherwise seemingly normal stream of data. Anomalous data can include instances of malicious code such as worms, viruses, Trojans, etc. In some of these detectors, an n-gram is looked at by the detector to determine if it is anomalous. An n-gram is a set of n units of data. For example, a 1-gram may be a single byte of data, and a 2-gram may be two bytes of data.

A content anomaly detection model based on 1-gram frequency distribution of datasets is effective at capturing attacks that display abnormal byte distributions, but it is vulnerable to attacks crafted to resemble normal byte distributions. A content anomaly detection model based on higher order n-grams frequency distribution of datasets can address this shortcoming. However, as the order of the n-grams increases, memory usage increases exponentially. This is because the maximum possible number of distinct n-grams increases exponentially as the order of the n-grams increases. For example, the maximum possible number of distinct 5-grams is $256^5$, or 1024 billion.

As new defensive (e.g., anomaly detection, etc.) techniques are developed to counter fast-spreading network threats, attackers have become more sophisticated as well. A model based on a mixture of high order n-grams frequency distribution can address threats posed by such sophisticated attackers, but only at the expense of heavy memory and computational overhead. For example, even for a small mixture of n-grams of modest orders, such as a mixture of 2-grams, 3-grams, and 4-grams, the total memory capacity may be impracticable.

SUMMARY

Systems, methods, and media for outputting data based on anomaly detection are provided. In some embodiments, methods for outputting data based on anomaly detection include: receiving a known-good dataset; storing distinct n-grams from the known-good dataset to form a binary anomaly detection model; receiving known-good new n-grams; computing a rate of receipt of distinct n-grams in the new n-grams; determining whether further training of the anomaly detection model is necessary based on the rate of receipt on distinct n-grams; using the binary anomaly detection model to determine whether an input dataset contains an anomaly; and outputting the input dataset based on whether the input dataset contains an anomaly.

In some embodiments, methods for outputting data based on anomaly detection include: receiving known anomaly signatures; generating n-grams of different sizes using the known anomaly signatures; storing abnormal n-grams in the n-grams of different sizes in a binary anomaly detection model; using the binary anomaly detection model to determine whether an input dataset contains an anomaly; and outputting the input dataset based on whether the input dataset contains an anomaly.

In some embodiments, methods for outputting data based on anomaly detection include: receiving a shared binary anomaly detection model; comparing the shared binary anomaly detection model with a local anomaly detection model; combining the shared binary anomaly detection model with the local anomaly detection model to form a new binary anomaly detection model; using the model to determine whether an input dataset contains an anomaly; and outputting the input dataset based on whether the input dataset contains an anomaly.

In some embodiments, methods for outputting data based on anomaly detection include: receiving an input dataset; generating n-grams of different sizes from the input dataset; counting the number of distinct n-grams in the n-grams of different sizes that are not present in a binary anomaly detection model; computing an anomaly score based upon the number of distinct n-grams and a total count of the n-grams in the input dataset; using the anomaly score to determine whether an input dataset contains an anomaly; and outputting the input dataset based on whether the input dataset contains an anomaly.

In some embodiments, methods for outputting data based on anomaly detection include: receive an input dataset; using a binary anomaly detection model to determine whether an input dataset is likely to contain an anomaly; if the input dataset is determined to be likely to contain an anomaly, dropping the input dataset; and if the input dataset is determined to be unlikely to contain an anomaly, outputting the input dataset based on whether the input dataset contains an anomaly.

In some embodiments, computer-readable media containing computer-executable instructions that, when executed by a processor, cause the processor to perform a method for outputting data based on anomaly detection, are provided. This method includes: receiving a known-good dataset; storing distinct n-grams from the known-good dataset to form a binary anomaly detection model; receiving known-good new n-grams; computing a rate of receipt of distinct n-grams in the new n-grams; determining whether further training of the anomaly detection model is necessary based on the rate of receipt on distinct n-grams; using the binary anomaly detection model to determine whether an input dataset contains an anomaly; and outputting the input dataset based on whether the input dataset contains an anomaly.

In some embodiments, computer-readable media containing computer-executable instructions that, when executed by a processor, cause the processor to perform a method for outputting data based on anomaly detection, are provided. This method includes: receiving known anomaly signatures; generating n-grams of different sizes using the known anomaly signatures; storing abnormal n-grams in the n-grams of different sizes in a binary anomaly detection model; using the binary anomaly detection model to determine whether an input dataset contains an anomaly; and outputting the input dataset based on whether the input dataset contains an anomaly.

In some embodiments, computer-readable media containing computer-executable instructions that, when executed by a processor, cause the processor to perform a method for outputting data based on anomaly detection, are provided. This method includes: receiving a shared binary anomaly detection model; comparing the shared binary anomaly detection model with a local anomaly detection model; combining the shared binary anomaly detection model with the local anomaly detection model to form a new binary anomaly detection model; using the model to determine whether an input dataset contains an anomaly; and outputting the input dataset based on whether the input dataset contains an anomaly.

In some embodiments, computer-readable media containing computer-executable instructions that, when executed by a processor, cause the processor to perform a method for outputting data based on anomaly detection, are provided. This method includes: receiving an input dataset; generating n-grams of different sizes from the input dataset; counting the number of distinct n-grams in the n-grams of different sizes that are not present in a binary anomaly detection model; computing an anomaly score based upon the number of distinct n-grams and a total count of the n-grams in the input dataset; using the anomaly score to determine whether an input dataset contains an anomaly; and outputting the input dataset based on whether the input dataset contains an anomaly.

In some embodiments, computer-readable media containing computer-executable instructions that, when executed by a processor, cause the processor to perform a method for outputting data based on anomaly detection, are provided. This method includes: receive an input dataset; using a binary anomaly detection model to determine whether an input dataset is likely to contain an anomaly; if the input dataset is determined to be likely to contain an anomaly, dropping the input dataset; and if the input dataset is determined to be unlikely to contain an anomaly, outputting the input dataset based on whether the input dataset contains an anomaly.

In some embodiments, systems for outputting data based on anomaly detection are provided. The systems include a digital processing device that: receives a known-good dataset; stores distinct n-grams from the known-good dataset to form a binary anomaly detection model; receives known-good new n-grams; computes a rate of receipt of distinct n-grams in the new n-grams; determines whether further training of the anomaly detection model is necessary based on the rate of receipt on distinct n-grams; uses the binary anomaly detection model to determine whether an input dataset contains an anomaly; and outputs the input dataset based on whether the input dataset contains an anomaly.

In some embodiments, systems for outputting data based on anomaly detection are provided. The systems include a digital processing device that: receives known anomaly signatures; generates n-grams of different sizes using the known anomaly signatures; stores abnormal n-grams in the n-grams of different sizes in a binary anomaly detection model; uses the binary anomaly detection model to determine whether an input dataset contains an anomaly; and outputs the input dataset based on whether the input dataset contains an anomaly.

In some embodiments, systems for outputting data based on anomaly detection are provided. The systems include a digital processing device that: receives a shared binary anomaly detection model; compares the shared binary anomaly detection model with a local anomaly detection model; combines the shared binary anomaly detection model with the local anomaly detection model to form a new binary anomaly detection model; uses the model to determine whether an input dataset contains an anomaly; and outputs the input dataset based on whether the input dataset contains an anomaly.

In some embodiments, systems for outputting data based on anomaly detection are provided. The systems include a digital processing device that: receives an input dataset; generates n-grams of different sizes from the input dataset; counts the number of distinct n-grams in the n-grams of different sizes that are not present in a binary anomaly detection model; computes an anomaly score based upon the number of distinct n-grams and a total count of the n-grams in the input dataset; uses the anomaly score to determine whether an input dataset contains an anomaly; and outputs the input dataset based on whether the input dataset contains an anomaly.

In some embodiments, systems for outputting data based on anomaly detection are provided. The systems include a digital processing device that: receives an input dataset; uses a binary anomaly detection model to determine whether an input dataset is likely to contain an anomaly; if the input dataset is determined to be likely to contain an anomaly, drops the input dataset; and if the input dataset is determined to be unlikely to contain an anomaly, outputs the input dataset based on whether the input dataset contains an anomaly.

In accordance with some embodiments, methods for outputting data based on anomaly detection are provided, the methods comprising: receiving, using a hardware processor, an input dataset; identifying grams in the input dataset that substantially include distinct byte values; creating an input subset by removing the identified grams from the input dataset; determining whether the input dataset is likely to be anomalous based on the identified grams, and determining whether the input dataset is likely to be anomalous by applying the input subset to a binary anomaly detection model to check for an n-gram in the input subset; and outputting the input dataset based on the likelihood that the input dataset is anomalous.

In accordance with some embodiments, systems for outputting data based on anomaly detection are provided, the methods comprising: a hardware processor configured to: receive an input dataset; identify grams in the input dataset that substantially include distinct byte values; create an input subset by removing the identified grams from the input dataset; determine whether the input dataset is likely to be anomalous based on the identified grams, and determines whether the input dataset is likely to be anomalous by applying the input subset to a binary anomaly detection model to check for an n-gram in the input subset; and output the input dataset based on the likelihood that the input dataset is anomalous.

In accordance with some embodiments, non-transitory computer-readable media containing computer executable instructions that, when executed by a processor, cause the processor to perform methods for outputting data based on anomaly detection are provided, the methods comprising: receiving an input dataset; identifying grams in the input dataset that substantially include distinct byte values; creating an input subset by removing the identified grams from the input dataset; determining whether the input dataset is likely to be anomalous based on the identified grams, and determining whether the input dataset is likely to be anomalous by applying the input subset to a binary anomaly detection model to check for an n-gram in the input subset; and outputting the input dataset based on the likelihood that the input dataset is anomalous.

BRIEF DESCRIPTION OF THE DRAWINGS

FIG. 2 is a simple illustration of a method for generating, training, and sharing a binary-based content anomaly detection model and for using the content anomaly model to detect content anomalies in accordance with some embodiments of the disclosed subject matter.

FIG. 3 is a simple illustration of a method for generating and training a binary-based content anomaly detection model using known-good training datasets in accordance with some embodiments of the disclosed subject matter.

FIG. 4 is a simple illustration of a method for generating and training a binary-based content anomaly detection model using known anomaly signatures in accordance with some embodiments of the disclosed subject matter.

FIG. 5 is a simple illustration of a method for sharing binary-based content anomaly detection models in accordance with some embodiments of the disclosed subject matter.

DETAILED DESCRIPTION

Systems, methods, and media for outputting data based on anomaly detection are provided. In some embodiments of the disclosed subject matter, systems, methods, and media are provided for generating and/or training binary-based content anomaly detection models. The presence and/or absence of each of the distinct n-grams in a training dataset can be used to generate the detection models. For instance, a detection model can be generated using a set of n-grams in a training dataset that are observed during a training phase of the model. The model can be referenced during a detecting or testing phase to detect the payload of a data packet containing one or more never-before-seen n-grams.

In some embodiments of the disclosed subject matter, systems, methods, and media are provided for generating and updating an anomaly signature model. A binary-based content anomaly detection model has advantages in speed and memory efficiency, but it can be sensitive to noisy training datasets (i.e., training datasets that are not totally free of malicious code). An anomaly signature model containing a collection of signatures of known malicious code can be used to compensate for the risk of using corrupted training datasets that are associated with binary-based content anomaly detection models. For example, the signature content of samples of known malicious code can be used to build and update an anomaly signature model that can be used as a reference. For instance, such an anomaly signature model can be used to filter out malicious code from training datasets.

In some embodiments of the disclosed subject matter, systems, methods, and media are provided for sharing binary-based content anomaly detection models and anomaly signature models. A group of protected sites facing similar network security threats can share their models for enhancing the common defense against such threats. For example, the binary-based content anomaly detection model of each site in the group can be shared regularly to identify suspicious content commonly detected by multiple sites.

In some embodiments of the disclosed subject matter, systems, methods, and media are provided for creating and using a feedback loop between a binary-based content anomaly detector and a host-based detector. Interactions between a host-based detector and a binary-based detector can be developed over time. For example, a host-based detector can further examine a dataset suspected by a binary-based detector of containing malicious code and either confirm or correct the suspicion, thereby reducing the false-positive rate of the detector. The binary-based detector, in turn, can reduce the volume of the network traffic directed to the host-based detector, thereby reducing the overhead associated with running the host-based detector.

Figure 1:
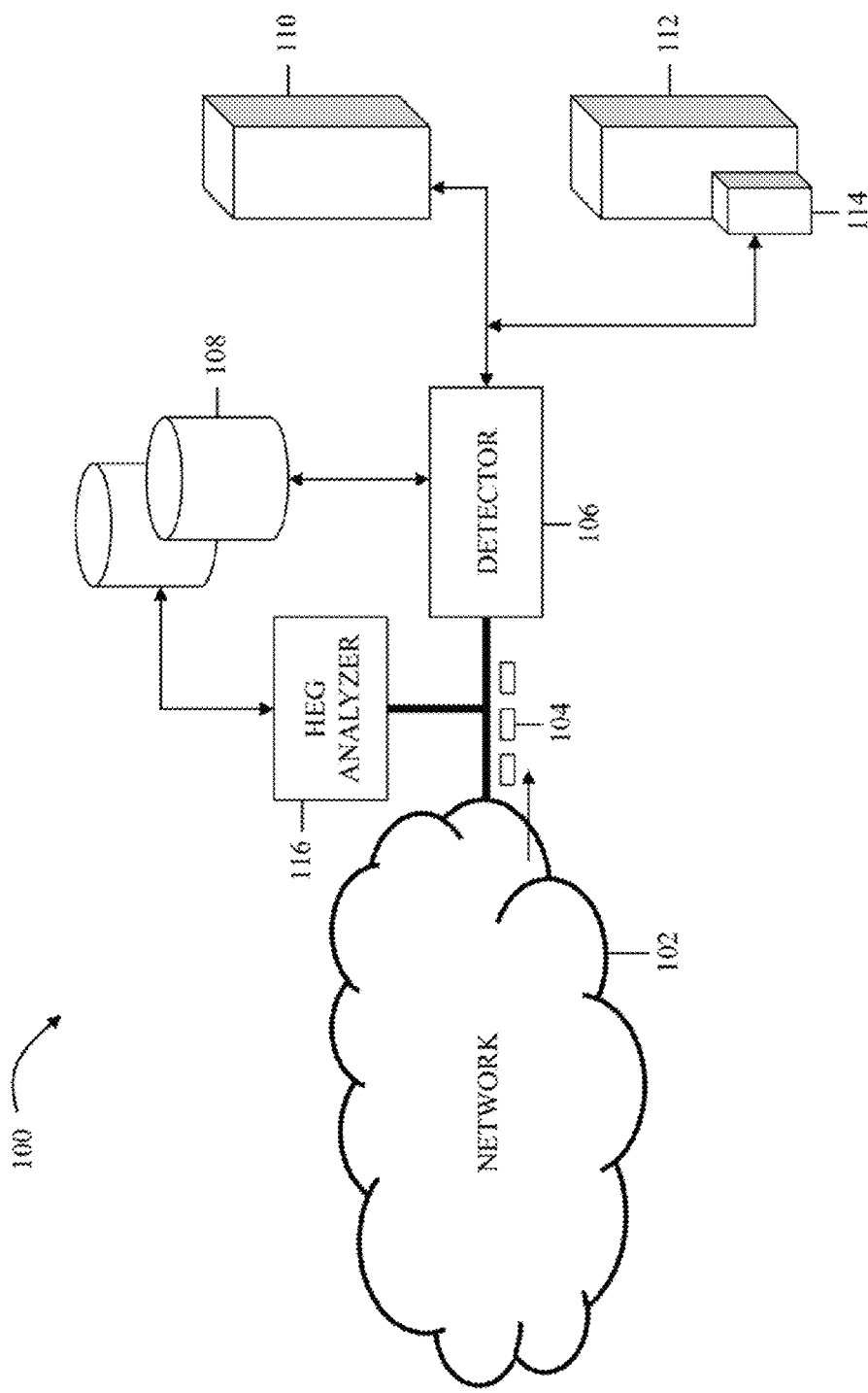
FIG. 1 is a schematic diagram of a system for generating, training, and sharing a binary-based content anomaly model and for using the content anomaly model to detect content anomalies in accordance with some embodiments of the disclosed subject matter.

FIG. 1 is a schematic diagram of a system 100 for detecting content anomalies in accordance with some embodiments. As illustrated, system 100 can include a network 102, data traffic 104, a detector 106, a data structure 108, a production server 110, a shadow server 112, a host-based detector 114, and a high-entropy-gram (HEG) analyzer 116. In some embodiments, detector 106, data structure 108, production server 110, shadow server 112, host-based detector 114, and HEG analyzer 116 can be implemented in a single device or a combination of devices. These device(s) can includes various suitable mechanisms for performing the functions associated with detector 106, data structure 108, production server 110, shadow server 112, host-based detector 114, and HEG analyzer 116. For example, such mechanisms can include a processor, digital processing device, memory, communications interfaces, displays, etc., such a general purpose computer, a special purpose computer, a server, a mobile phone, a personal data assistant, an email device, and/or various other suitable devices.

Network 102 can be a local area network (LAN), a wide area network (WAN), a wireless network, the Internet, a cable television network, a telephone network, and/or various other suitable networks from which malicious attacks can be launched.

Data traffic 104 can include one or more network data packets, data frames, one or more files that contain various types of data, such as text, graphic images, sound samples, video samples, and computer-executable codes, a stream of data in bytes or a stream of various other suitable symbols or tokens in one or more communication sessions, and/or various other forms of data in suitable formats.

In some embodiments, n-grams can be generated in detector 106 by sliding windows of arbitrary lengths over data traffic 104. Detector 106 can train a content anomaly detection model by storing the distinct n-grams observed during a training phase in data structure 108.

During a detection phase, detector 106 can score data traffic 104 on the basis of the number of never-before-seen n-grams contained in data traffic 104. The score can also be weighted by the number of malicious n-grams contained in data traffic 104. Detector 106 can capture the order dependence of byte sequences in data traffic 104 by modeling higher order n-grams. This can enable detector 106 to capture more sophisticated attacks.

Data structure 108 can be a data structure that allows for the modeling of a mixture of different sizes of n-grams. Data structure 108 may be implemented in random access memory (RAM), flash memory, a disk drive, optical media, and/or various other suitable storage technologies. In some embodiments, Bloom filters are used.

A Bloom filter can be defined as a bit array of m bits, where any individual bit is set if the hash of an input value (i.e., input value mod m) is i. A Bloom filter can act as a one-way data structure that can contain many items. An advantage of using a Bloom filter is that operations on a Bloom filter takes a constant amount of time regardless of the size of the Bloom filter, keeping computational overhead low. In some embodiments, the H3 hash function or SHA-1 hash function may be used in connection with a Bloom filter, although other hash functions may additionally or alternatively be used.

A Bloom filter may contain false positives if a collision occurs while performing a check operation. Collisions may occur because two distinct inputs into a hash function may produce identical outputs. Suppose, for example, that there are two distinct n-grams, A (which occurs in the training dataset only) and B (which occurs in the input dataset only), which both produce the same hash value. Because A is in the training dataset, the Bloom filter contains a bit set for A. If the Bloom filter is checked for B, however, because B hashes to the same value, then B can be mistakenly believed to be represented in the Bloom filter. This is a false positive.

Production server 110 and shadow server 112 can be used to run application programs that ultimately use data traffic 104. In some embodiments, detector 106 directs data traffic 104 to production server 110 when detector 106 determines that it is unlikely that data traffic 104 contains malicious code. In some embodiments, shadow server 112 and production server 110 can be configured to have the same software programs running, except that shadow server 112 can be operating in a protected environment using an emulator, virtual machine, sandbox or other suitable mechanism for protecting server 112 from potentially malicious code. In some embodiments, server 112 includes host-based detector 114 which can additionally or alternatively provide a protected environment using an emulator, virtual machine, sandbox or other suitable mechanism for protecting server 112 and detector 114 from potentially malicious code. Server 112 and/or host-based detector 114 can include one or more host-based fault detectors and patch generation techniques, such as StackGuard/MemGuard, Selective Transactional Emulator (STEM), and Dynamic Buffer Overflow Containment (DYBOC), and anti-virus scanners that can collect and maintain content anomaly signatures of malicious code, such as stealthy worms, etc. StackGuard and MemGuard can be obtained from "www (dot)freebsd(dot)com." STEM is discussed in detail in *Building a Reactive Immune System for Software Services* by Stelios Sidiroglou-Douskos, et al. DYBOC is discussed in detail in *A Dynamic Mechanism for Recovering from Buffer Overflow Attacks* by Stelios Sidiroglou-Douskos, et al.

In some instances, data traffic 104 that is directed to shadow server 112 may be falsely identified as containing an anomaly. Using host based detector 114, shadow server 112 may validate the data as not containing an instance of malicious code. Detector 106 and shadow server 112 can interact so that false positives that have been validated by shadow server 112 serve as training data to improve the accuracy of the content anomaly detection model of detector 106. Through this process, the false positive rate of detector 106 can decrease. This, in turn, can result in workload reduction for shadow server 112.

In some embodiments, shadow server 112 acts as a training supervisor, wherein server requests are sent to shadow server 112 and only those requests that generate a normal response are sent to detector 106 for training the content anomaly detection model of detector 106.

In some embodiments, detector 106 is deployed with no trained model and, instead it initially deems 100% of data traffic 104 as containing malicious requests. Shadow server 112 can then provide false-positive feedback and relevant training data to detector 106 for incremental training.

High-entropy-gram (HEG) analyzer 116 can be used to detect HEG grams and analyze scarcity of commonly occurring HEGs and HEG distributions of normal and malicious data. An HEG is a type of gram that has a high level (e.g., 98-100%) of its contents as distinct byte values. Using HEG grams can help reduce the amount of data that a Bloom filter must contain. This can be accomplished by making Bloom filters to contain non-HEG grams, such as data between commonly occurring HEGs.

HEG analyzer 116 can be a separate device running one or more analyzer programs. It can also be one or more programs run by detector 106.

FIG. 2 is a simple illustration of a method for generating, training, and sharing a binary-based content anomaly model and for using the content anomaly model to detect content anomalies in accordance with some embodiments. As shown at 202, a binary-based content anomaly detection model is generated and trained. In some embodiments, a binary-based content anomaly detection model is generated and trained using known good training datasets, for example, as described in connection with FIG. 3. In some embodiments, a binary-based content anomaly detection model is generated and trained using known anomaly signatures, for example, as described in connection with FIG. 4. In some embodiments, a binary-based content anomaly detection model is trained in cooperation with a host-based detector, for example, as described in connection with part 703 of FIG. 7.

At 204, the binary-based content anomaly detection model is shared. In some embodiments, a binary-based content anomaly detection model is received from one or more remote sites to compare with and update the local model, for example, as described in connection with FIG. 5.

At 206, the binary-based content anomaly detection model is used to detect content anomalies. In some embodiments, an anomaly score of an input dataset is used to determine whether the input dataset is anomalous, for example, as described in connection with FIG. 6. In some embodiments, a binary-based content anomaly detection model is used to compute the likelihood of an input dataset containing malicious code and classify the input dataset based on the computed likelihood, for example, as described in connection with part 701 of FIG. 7.

FIG. 3 is a simple illustration of a method 300 for training a content anomaly detection model in accordance with some embodiments. As shown, at 302, a training dataset is received. In some embodiments, the training dataset can include one or more network data packets or data frames. In some embodiments, the training dataset can include one or more files that contain various types of data, such as text, graphic images, sound samples, video samples, computer-executable codes, various other suitable types of data, and/or one or more combinations thereof. In some embodiments, the training dataset can also include a stream of data in bytes, a stream of tokens, and a stream of various other suitable symbols or units in one or more communication sessions.

In some embodiments, the training dataset can be received from another site through a network, such as network 102. In some embodiments, it can be received from data structure 108, production server 110, shadow server 112, host-based detector 114, HEG analyzer 116, various other suitable sources, and one or more combinations thereof.

In some embodiments, the training dataset can be checked to ascertain its validity before it is used for training content anomaly detection models to ward off potential training attacks. Such a validation effort can also help avoid inadvertently immunizing one or more instances of malicious code from being detected. For example, a training dataset can be processed to determine whether it harbors any data that produces erroneous or otherwise unusual or invalid outcomes.

At 304, distinct n-grams of different sizes contained in the training dataset can be stored in a data structure, such as data structure 108, to form a model. In some embodiments, n-grams of different sizes can be generated by sliding windows of corresponding sizes over the training dataset and the distinct n-grams of different sizes contained in the training dataset can be stored when they are observed for the first time.

In some embodiments, hashed n-grams formed when the Bloom filter stores an n-gram can be cached to speed up the Bloom filter's check operations being used as part of a detection process, as described below in connection with data structure 108 in FIG. 1. This is advantageous because hash values can be looked up instead of being computed.

In some embodiments, a class of universal hash functions, such as $H_3$, can be used to reduce computational overhead associated with inserting and/or checking n-grams over a large amount of data. Given such universal hash functions, for example, re-computing hashes can be avoided when sliding n-grams windows and/or when using different window sizes. Suppose, for instance, that the hash of a 7-gram is needed and a 5-gram is hashed. The universal hash functions can hash an incremental 2-gram and combine it with the 5-gram hash value to generate a 7-gram hash.

In some embodiments, a detector, such as detector 106, can be used to generate the n-grams of different sizes and store the distinct n-grams. In some embodiments, an HEG analyzer 116 can be used to generate the n-grams of different sizes and store the distinct n-grams.

At 306, known-good new n-grams are received and a rate at which a new distinct n-gram is observed is computed. In some embodiments, detector 106 can be used to compute the new n-grain rate. In some embodiments, HEG analyzer 116 can be used to compute the new n-gram rate.

In some embodiments, new distinct n-grams that are observed over a time period can be used to compute the new n-gram rate. For example, the number of new distinct n-grams counted every 100 hours (or other period of time) can be used to compute the new n-gram rate. In some embodiments, new distinct n-grams that are observed from a number of data packets can be counted to compute the new n-gram rate. For example, a number of new distinct n-grams counted from every 1,000 data packets (or other number of data packets) can be used to compute the new n-gram rate.

At 308, it is determined whether further training of the content anomaly detection model is warranted using the new n-gram rate computed at 306. During the initial training period, it can be expected that many new distinct n-grams are observed. Over time, however, fewer distinct never-before-seen n-grams may be observed.

In some embodiments, a content anomaly detection model is deemed to have been sufficiently trained when the new n-gram rate becomes stable and low. If, for example, three consecutive new n-gram rates computed every 10,000 data packets are very close in value, a content anomaly detection model can be said to have been sufficiently trained in some embodiments. In some embodiments, a content anomaly detection model can also be said to have been sufficiently trained if four consecutive new n-gram rates computed every 30 days are very close in value. Various other metrics can be used additionally or alternatively to determine when the model is sufficiently trained.

If it is determined at 308 that further training is necessary, 306 and 308 can be repeated. If, however, it is determined at 310 that no further training is necessary, the content anomaly detection model can be deployed for detecting content anomalies of data traffic, such as data traffic 104.

FIG. 4 is a simple illustration of another method for generating and training a content anomaly detection model in accordance with some embodiments. As shown, at 402, known anomaly signatures are received. In some embodiments, the signature content of Snort rules from Sourcefire® and a collection of known virus samples are received. For example, such signatures can be purchased and/or downloaded from a trust-worthy web site, such as the one maintained by Sourcefire®.

In some embodiments, the anomaly signatures are stored in data structure 108. In some embodiments, it can be stored at detector 106, or HEG analyzer 116.

At 404, n-grams of different sizes are generated from the anomaly signatures. In some embodiments, as in 304 of FIG. 3 or 606 of FIG. 6, n-grams of different sizes can be generated by sliding windows of corresponding sizes over the content anomaly signatures.

At 406, the n-grams of different sizes generated in 404 are filtered to remove normal n-grams using a known-clean dataset. This may be necessary because the anomaly signatures may still have some normal n-grams. For example, an attack disguising as an HTTP request can still contain normal keywords, such as GET. In some embodiments, a Bloom filter containing known-clean datasets can be compared with the input dataset to identify normal n-grams. In some embodiments, the filtering operation is performed by detector 106.

At 408, distinct n-grams from the abnormal n-grams of different sizes are stored. In some embodiments, a Bloom filter can be used to store the distinct n-grams of different sizes. Instead of using n bytes to represent an n-gram, for example, a Bloom filter can store an n-gram using just few bits. For instance, a 24-bit Bloom filter is capable of holding $2^{24}/N_h$ elements, where $N_h$ represents the number of hash functions used.

At 410, it is determined whether the content anomaly detection model needs to be updated. In some embodiments, the content anomaly model can be updated incrementally following one or more releases of new anomaly signatures due to identifications of new viruses and/or an update of the Snort rules. If it is determined that the content anomaly model needs to be updated, 402, 404, 406, and 408 can be repeated.

In some embodiments, training datasets are scrutinized using the content anomaly detection model. For example, n-grams in the training datasets matching the content anomaly detection model can be dropped. In some embodiments, an entire data packet can be dropped if the packet contains too many n-grams that match the content anomaly detection model. In some embodiments, a 5% (or other percent threshold) bad n-gram threshold is used to determine whether to drop an entire packet out of the training datasets.

In some embodiments, if a never-before-seen n-gram with respect to both the good and bad content anomaly detection model appear, its detection score is further weighted by a factor of 5 (or other factors) over other malicious n-grams. This enables further separation of malicious packets from normal ones in order to achieve higher detection accuracy.

FIG. 5 is a simple illustration of a method for sharing content anomaly detection models in accordance with some embodiments. As shown, at 502, a trained binary-based detection model is shared. The models may be distributed from one detector to another using email, ftp, http, and/or various other suitable mechanisms.

In some embodiments, Bloom filters are used to provide mechanism for sharing n-grams generated from potentially malicious code among multiple sites. Bloom filters are capable of preserving privacy of traffic content of each site because Bloom filters share signature information with little risk of revealing content information. For example, a Bloom filter can confirm the presence/absence of an n-gram with little risk of disclosing the original n-gram.

In some embodiments, a single Bloom filter contains n-grams associated with more than one type of potentially malicious code to reduce memory overhead further than if separate Bloom filters were used. This also enables a reduction in the computational overhead. For example, by holding multiple types of potentially malicious code in a single Bloom filter, the common n-grams that are shared between different types of potentially malicious code are stored only once, reducing memory overhead when compared to storing duplicate copies of identical n-grams.

In some embodiments, a Bloom filter is compressed before it is transmitted for efficient transmission. For example, Bloom filters can be compressed using LZW compression algorithm before they are transmitted to remote sites.

At 504, the content of a local model is compared with the content of a shared model from a remote site. In some embodiments, the contents of the local model and the shared model are compared by using a bitwise AND operation. In some embodiments, a similarity score between the local model and each of the shared models is computed. In some embodiments, the similarity score is computed using the following formula:

$$\text{Score} = 2 * \frac{N_c}{(N_1 + N_2)},$$

where $N_c$ is the number of common n-grams and $N_i$ the number of suspicious n-grams in alert i. If a Bloom filter is used, a count of items in the filter is be kept in some embodiments. In some embodiments, the count is estimated by $$N_k / N_h,$$

where $N_b$ is the number of bits set in the filter and $N_h$ is the number of hash function used by the filter.

A higher score implies that the local model and a shared model have many common n-grams. In some embodiments, the more commonly observed n-grams are given more weight for determining the likelihood of being a part of an instance of malicious code.

At 506, the local model is updated using each of the shared models. In one embodiments, one or more shared models from remote sites are merged into the local model. For example, the content of the shared model from the remote site can be merged into the content of the local model by performing a bitwise OR operation on the pair of models. This is advantageous because the local model can learn the signature of a new type of malicious code before confronting an instance of the new malicious code.

Figure 6:
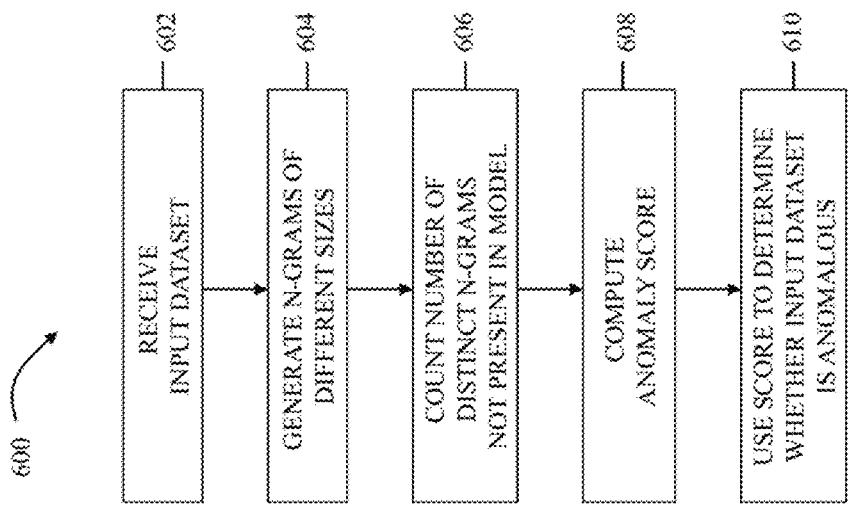
FIG. 6 is a simple illustration of a method for using binary-based content anomaly detection models to detect content anomalies in accordance with some embodiments of the disclosed subject matter.

FIG. 6 is a simple illustration of a method 600 for detecting content anomalies in accordance with some embodiments. As shown, at 602, an input dataset, or a portion thereof, is received. As in 302 for the training dataset, the input dataset can be network data packets or frames, files containing data in variety of types and formats, or a stream of bytes or tokens of different lengths. In some embodiments, the input dataset can be data traffic, such as data traffic 104.

In some embodiments, the input dataset can be a test dataset that is designed to measure how well a content anomaly detection model is trained. In some embodiments, the input dataset can be a stream of incoming bytes that should be scrutinized before reaching its destinations.

At 604, n-grams of different sizes are generated from the input dataset. In some embodiments, as in 304, n-grams of different sizes can be generated by sliding windows of corresponding sizes over the input dataset.

At 606, the number of distinct n-grams of different sizes in the input dataset that are not found in the training dataset are counted. In some embodiments, a counter is incremented when a distinct n-gram is observed for the first time by checking a Bloom filter that was previously trained with known-good n-grams to see if the distinct n-gram has seen in the training dataset. In some embodiments, the number of distinct n-grams is counted at the content anomaly detector. In some embodiment, it can be counted at the HEG analyzer.

At 608, an anomaly score for the input dataset is computed using the number of distinct n-grams counted in 606. In some embodiments, the anomaly score is computed using the following formula:

$$\text{Anomaly Score} = \frac{N}{T},$$

where T is the total number of n-grams in the input dataset and N is the number of new distinct n-grams not found in the training dataset. The higher the anomaly score, the more likely that the input dataset contains an instance of malicious code.

In some embodiments, the anomaly score can be calculated at the content anomaly detector. In some embodiments, it can be computed at the HEG analyzer.

At 610, the anomaly score can be used to determine whether the input dataset is anomalies. In some embodiments, if the input dataset generates an anomaly score above a threshold value, it can be used to generate content anomaly signatures. In some embodiments, for example, different sizes of n-grams can be generated by sliding windows of corresponding sizes over the input data. In some embodiments, the n-grams of different sizes are filtered to remove normal n-grams using a known-clean dataset, as described above in connection with 406 of FIG. 4.

Figure 7:
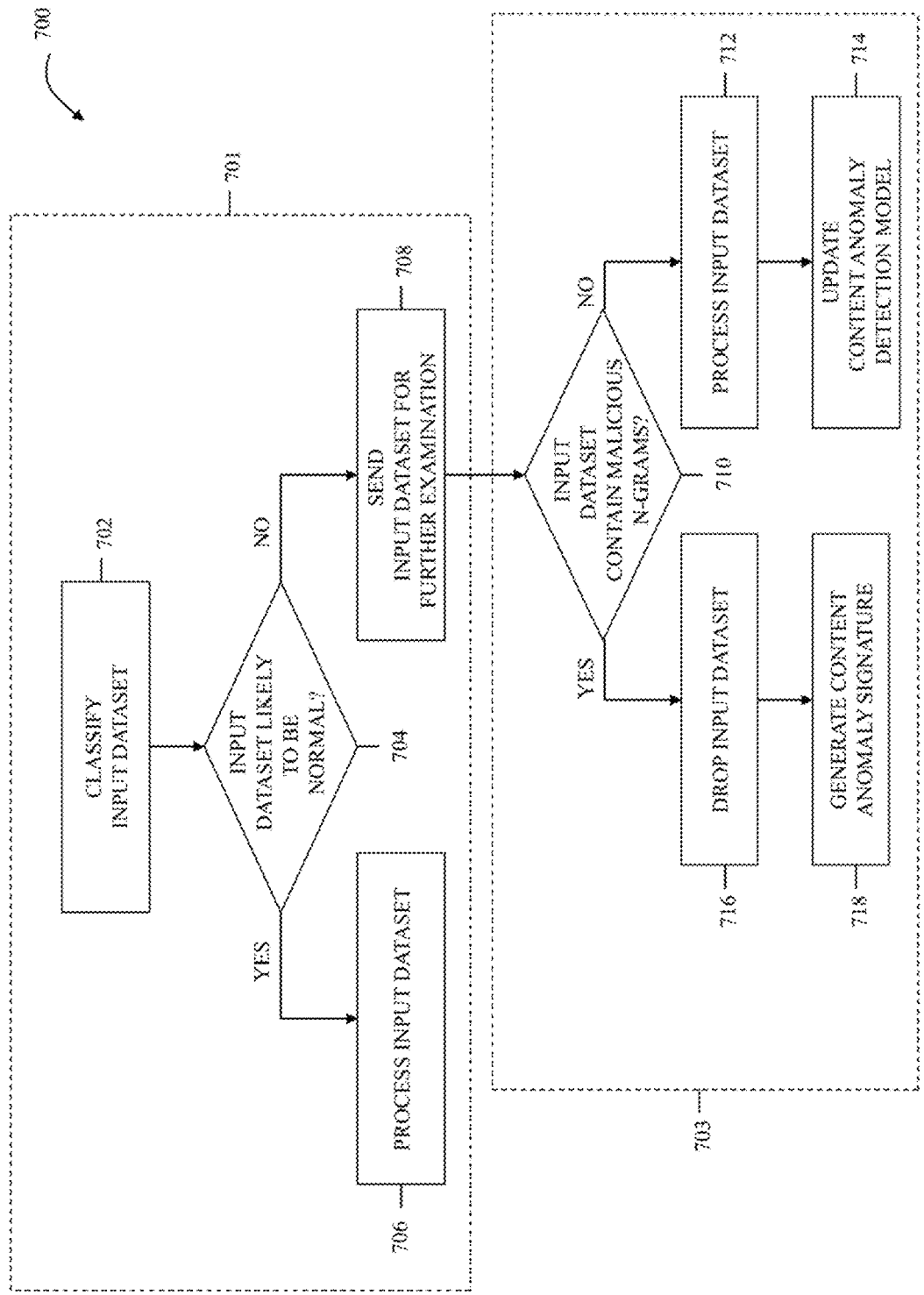
FIG. 7 is a simple illustration of a method for training a content anomaly detection model and using the model to detect content anomalies in accordance with some embodiments of the disclosed subject matter.

FIG. 7 is a simple illustration of another method 700 for training and detecting content anomalies in accordance with some embodiments. As shown, at 702, an input dataset is classified. In some embodiments, content anomaly detector 106 can act as a network anomaly flow classifier to determine whether the input dataset contains instances of malicious code. Detector 106 classifies the data traffic and directs it to an appropriate server, such as production server 110 or shadow server 112.

At 704, the likelihood of the input dataset containing malicious n-grams is determined. In some embodiments, the likelihood of the input dataset containing malicious n-grams based on anomaly scores, which can be computed as discussed above in connection with 608, is determined.

If it is determined at 704 that the likelihood of the input dataset containing malicious n-grams is low, the input dataset is further processed at 706. In some embodiments, an input dataset, such as data traffic 104, that is determined not to contain malicious n-grams can be sent to a production server, such as production server 110, to be processed further.

If, however, it is determined at 704 that the likelihood of the input dataset containing malicious n-grams is above a threshold, the input dataset can be flagged and sent at 708 to a non-production server that runs an additional content anomaly detector. In some embodiments, an input dataset, such as data traffic 104, that is deemed likely to contain malicious n-grams is sent to host-based detector 114 that can be part of, or attached to, a shadow server, such as shadow server 112. The host-based detector can employ more sophisticated techniques that require more processing time and computational overhead to examine the input dataset that is sent from detector 106.

At 710, it is determined whether the flagged input dataset contains malicious n-grams. In some embodiments, the host-based detector examines the flagged input dataset and determine whether to process it further or to drop it.

If it is determined at 710 that the flagged input dataset contains malicious n-grams, the flagged dataset can be dropped or isolated at 716. In some embodiments, the host-based detector can be used to isolate the input dataset.

At 718, the isolated dataset is used to generate content anomalous signatures. In some embodiments, the host-based detector can generate new content anomaly signatures and feed it back to the classifier for further training of its content anomaly detection model, as described above in connection with FIG. 4.

If, however, it is determined at 710 that the flagged input dataset is unlikely to contain malicious n-grams, the input dataset can be processed further at 712. In some embodiments, the host-based detector can send the input dataset to the shadow server for further processing. For example, in some embodiments, the shadow server processes the input dataset in a protected environment, such as a sandbox, and monitors the state change of the sandbox. In some embodiments, the sandbox is implemented using an emulator or a virtual machine.

At 714, the content anomaly detection model is updated to include the n-grams contained in the flagged input dataset, as described above in connection with 302 and 304 of FIG. 3. This may prevent them from causing false positives again in the future, thereby reducing the false positive rate of the content anomaly detection model. In some embodiments, the host-based detector can provide feedback necessary for the classifier to update its content anomaly detection model.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for outputting data based on anomaly detection, comprising:

receiving, using a hardware processor, an input dataset;
identifying commonly occurring grams in the input dataset that substantially include distinct byte values;
creating an input subset by removing the identified grams from the input dataset;
determining whether the input dataset is likely to be anomalous based on the identified grams, and determining whether the input dataset is likely to be anomalous by applying the input subset to a binary anomaly detection model to check for an n-gram in the input subset, wherein the binary detection model is represented using a Bloom filter; and
outputting the input dataset based on the likelihood that the input dataset is anomalous.

2. The method of claim 1, wherein the Bloom filter contains grams other than the commonly occurring grams that substantially include distinct byte values.

3. The method of claim 1, further comprising dropping the input dataset in response to determining that the input dataset is likely to be anomalous.

4. The method of claim 1, further comprising sending the input dataset to a host based anomaly detector in response to determining that the input dataset is likely to be anomalous.

5. A system for outputting data based on anomaly detection, comprising:

a hardware processor configured to:
receive an input dataset;
identify commonly occurring grams in the input dataset that substantially include distinct byte values;
create an input subset by removing the identified grams from the input dataset;
determine whether the input dataset is likely to be anomalous based on the identified grams, and determines whether the input dataset is likely to be anomalous by applying the input subset to a binary anomaly detection model to check for an n-gram in the input subset, wherein the binary detection model is represented using a Bloom filter; and
output the input dataset based on the likelihood that the input dataset is anomalous.

6. The system of claim 5, wherein the Bloom filter contains grams other than the commonly occurring grams that substantially include distinct byte values.

7. The system of claim 5, wherein the hardware processor is further configured to drop the input dataset in response to determining that the input dataset is likely to be anomalous.

8. The system of claim 5, wherein the hardware processor is further configured to send the input dataset to a host based anomaly detector in response to determining that the input dataset is likely to be anomalous.

9. A non-transitory computer-readable medium containing computer executable instructions that, when executed by a processor, cause the processor to perform a method for outputting data based on anomaly detection, the method comprising:

receiving an input dataset;
identifying commonly occurring grams in the input dataset that substantially include distinct byte values;
creating an input subset by removing the identified grams from the input dataset;
determining whether the input dataset is likely to be anomalous based on the identified grams, and determining whether the input dataset is likely to be anomalous by applying the input subset to a binary anomaly detection model to check for an n-gram in the input subset, wherein the binary detection model is represented using a Bloom filter; and outputting the input dataset based on the likelihood that the input dataset is anomalous.

10. The non-transitory computer-readable medium of claim 9, wherein the Bloom filter contains grams other than the commonly occurring grams that substantially include distinct byte values.

11. The non-transitory computer-readable medium of claim 9, wherein the method further comprises dropping the input dataset in response to determining that the input dataset is likely to be anomalous.

12. The non-transitory computer-readable medium of claim 9, wherein the method further comprises sending the input dataset to a host based anomaly detector in response to determining that the input dataset is likely to be anomalous.

* * * * *